United States Patent [19]

Akimori et al.

[11] Patent Number: 5,109,942
[45] Date of Patent: May 5, 1992

[54] MOTORCYCLE BODY COVER

[75] Inventors: Giichiro Akimori; Hideaki Nebu, both of Saitama, Japan

[73] Assignee: Honda Giken Kogyo Kabushiki Kaisha, Tokyo, Japan

[21] Appl. No.: 434,350

[22] Filed: Nov. 13, 1989

Related U.S. Application Data

[63] Continuation of Ser. No. 97,782, Sep. 16, 1987, abandoned.

[30] Foreign Application Priority Data

| Sep. 18, 1986 | [JP] | Japan | 61-217983 |
| Sep. 18, 1986 | [JP] | Japan | 61-217984 |
| Sep. 18, 1986 | [JP] | Japan | 61-217985 |
| Sep. 19, 1986 | [JP] | Japan | 61-219116 |

[51] Int. Cl.⁵ ............................................. B62J 17/00
[52] U.S. Cl. ................................. 180/219; 280/288.2; 280/288.3; 280/288.4; 296/78.1
[58] Field of Search ............... 180/219, 228, 229; 280/727, 288.2, 288.3, 288.4; D12/181, 182; 296/78.1

[56] References Cited

U.S. PATENT DOCUMENTS

| 4,461,508 | 7/1984 | Ogishima | 296/78.1 |
| 4,473,251 | 9/1984 | Murayama | 296/78.1 |

FOREIGN PATENT DOCUMENTS

3204664 8/1983 Fed. Rep. of Germany ..... 296/78.1

Primary Examiner—Mitchell J. Hill
Attorney, Agent, or Firm—Lyon & Lyon

[57] ABSTRACT

A vehicle body cover includes a fairing outer and a fairing inner mounted onto the fairing outer. An instrument panel is supported by the fairing inner. Left and right side panels each have an inner wall with an upper rim, and an outwardly extending flange attached to said fairing outer. A top cover overlies and connects to the upper rims of the side panels, and has arms attached to the fairing inner.

23 Claims, 6 Drawing Sheets

MOTORCYCLE BODY COVER

This application is a continuation of application Ser. No. 097,782, filed Sep. 16, 1987, now abandoned.

BACKGROUND OF THE INVENTION

The field of the present invention is motorcycle body covers.

Motorcycles may be fitted with various body covers or fairings. The type of covers used, and the sections of the motorcycle to which covers are applied vary with the different types of motorcycles. In certain cases, a motorcycle may have a cover over all of its surfaces. In all applications, the covers function to redirect air flow around the vehicle body, thereby reducing wind resistance and drag on the motorcycle. The covers also present a smooth-looking and attractive appearance.

In the past, motorcycles have been provided with a cover on the upper front portion of the vehicle, with the cover having a relatively narrow rear extension provided for the feet of a rider straddling the seat. Such covers have been comprised of a relatively narrow rear cover bridge 02 positioned immediately in front of the seat 01 and connected to a forward cover 04 having a leg flap 05 covering the forward sections of the rear cover bridge. The forward cover 04 is connected to the rear cover bridge 02 through a horizontal sidestrip 06, with the leg flap 05 of the forward cover being connected to a kick panel 07 of the horizontal side strip 06. The leg flap 05 has a side surface joined to a knee section 03 of the rear cover bridge 02 via the kick panel 07 of the horizontal side strip 06.

However, with this known vehicle body cover, since the horizontal side strip 06 must be combined respectively to the rear cover bridge 02 and the forward cover 04, assembly of these components can be difficult. In addition, the seams or joints between the horizontal side strip 06 and the rear cover bridge 02 are partially exposed, i.e. wherein the kick panel 07 is joined to the knee sections 03, and are readily apparent on both sides of the vehicle. Thus, the cover components do not appear as an integral unit due to the presence of the joints, and do not have the strength and stiffness of an integral unit.

SUMMARY OF THE INVENTION

The present invention is directed to an improved vehicle body cover. To this end, a vehicle body cover includes a front fairing on the front section of the vehicle and side panels on either side of the vehicle behind the front fairing. The side panels each include an integral flange projecting outwardly with the outer edge of each flange being joined to the rear edge of the front fairing.

As the outer edge of the flange is joined directly to the rear edge of the front fairing, intermediate pieces such as a horizontal side strip may be eliminated; and thus, assembly is simplified. In addition, as the side panels include the integral flanges projecting outwardly therefrom, visible seams within the body cover may be avoided such that the appearance of the vehicle body cover is improved.

In further aspects of the present invention an inner fairing may be employed ahead of the side flanges to provide an interior surface to the front fairing, and instrument panel and the like. Preferably, a top cover is joined to and overlies an upper rim having a groove on each side panel. An instrument panel may also be provided in between gussets on either side of the inner fairing. In addition, the inner fairing may include frames each having a rear ledge for attachment to the flanges.

Accordingly, it is an object of the present invention to provide an improved vehicle body cover.

It is a further object of the present invention to provide a cover construction providing further elimination of or reduction of visible seams or joints.

It is yet another object of the invention to provide such a vehicle body cover which is relatively easy to assemble. Other and further objects and advantages will appear hereinafter.

BRIEF DESCRIPTION OF THE DRAWINGS

In the drawings, wherein similar reference characters denote similar elements throughout the several views.

DETAILED DESCRIPTION OF THE DRAWINGS

Figure 1:
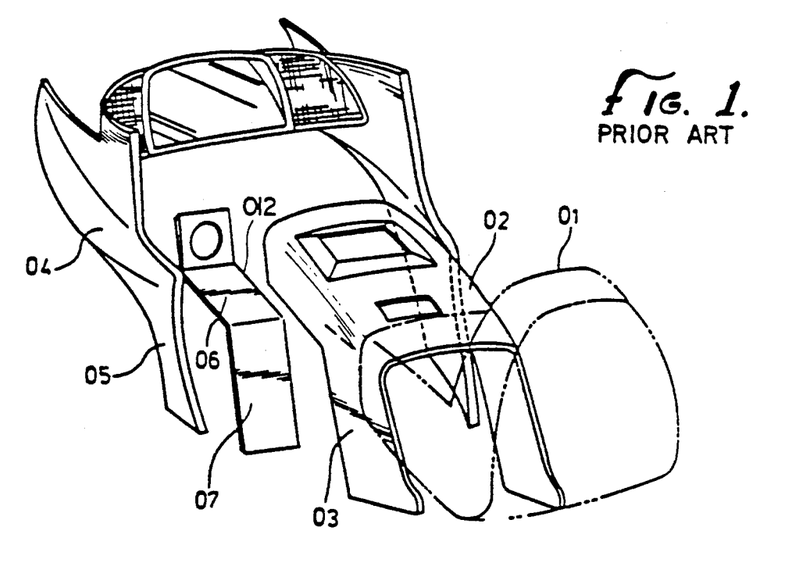
FIG. 1 is an exploded perspective view of a prior known vehicle body cover.

Turning in detail to the drawings, FIG. 1 illustrates a known prior body cover having a rear cover bridge 02 which is relatively narrow and covers the immediate front portion of a seat 01. A forward cover 04 in this known configuration has a leg flap 05 on either side covering or overlapping knee sections 03 of the rear cover bridge 02. An intermediary piece 012 comprising a horizontal side strip 06 and a kick panel 07 is disposed in between the leg flap 05 and the knee section 03. The leg flap 05 is joined to the knee section 03 via the kick panel 07 which forms the lower section of the intermediary piece 012.

Figure 2:
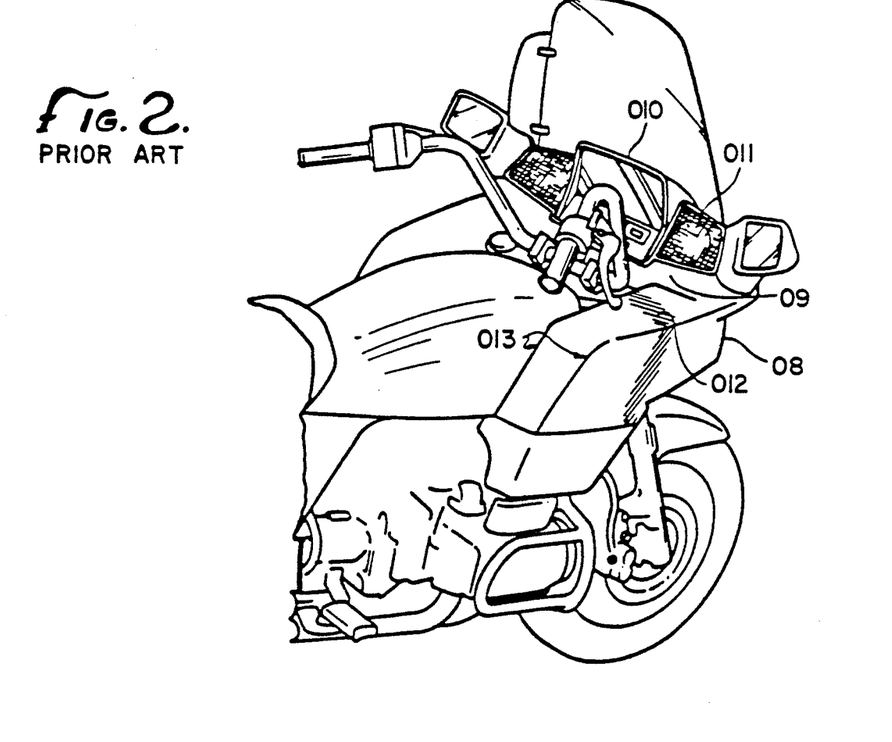
FIG. 2 is a rear perspective view fragment of a prior known body cover assembled onto a motorcycle.

FIG. 2 illustrates a known prior body cover having an outside cover 08 and an inside cover 09. Speakers 011 are provided on either side of a meter board 010 and face rearwardly. The meter board 010 and the speakers 011 are mounted separately on the inside cover 09. For this reason, these components do not contribute to the stiffness of the inside cover 09. The meter board 010 and speakers 011 are essentially only suspended weights on the inside cover 09, rather than acting as structural elements. Accordingly, the inside cover 09 must be stiffened in order to support the additional loads of the meter board 010 and speakers 011. This has a tendency to increase the weight of the front fairing.

Figure 3:
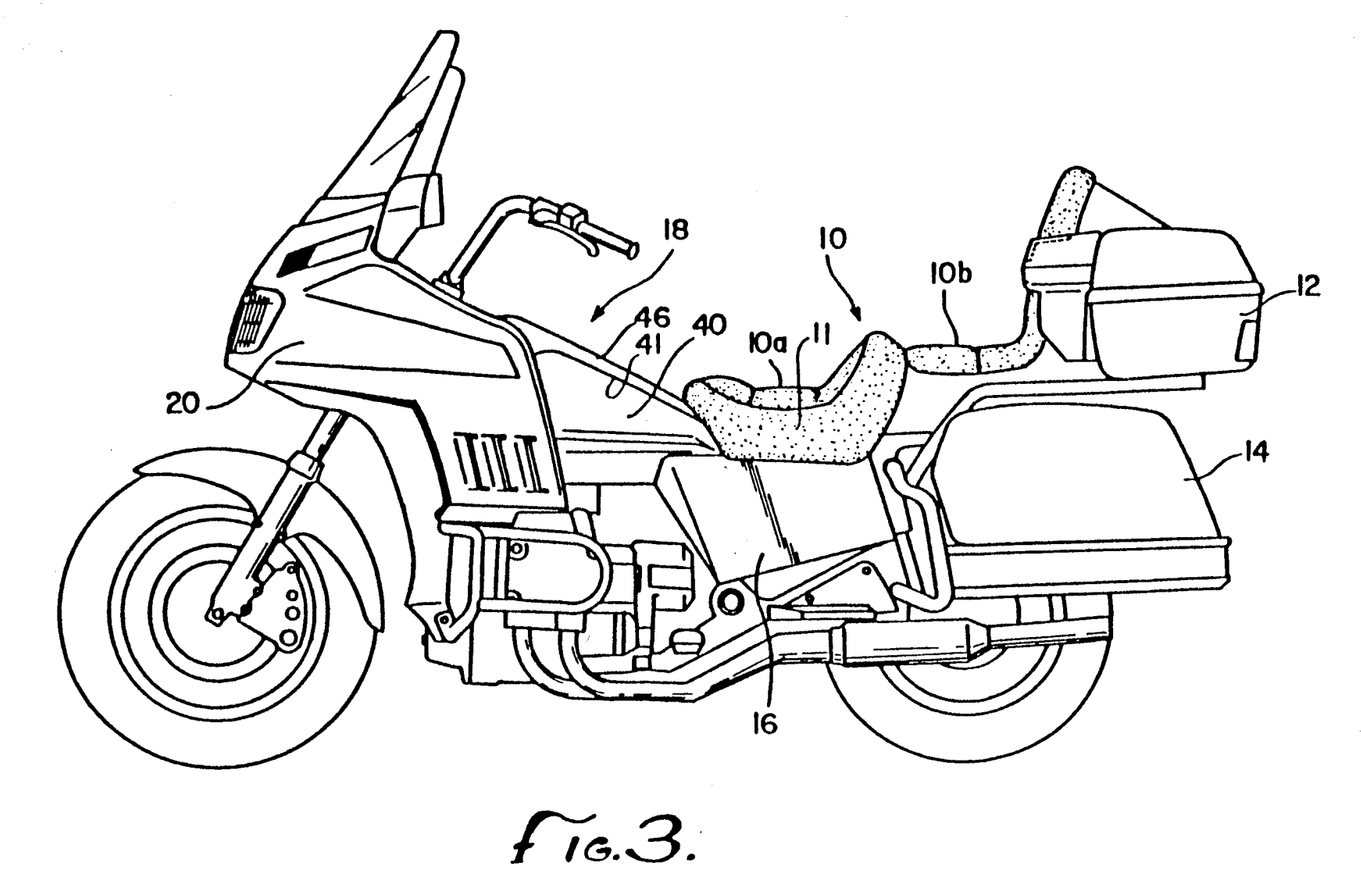
FIG. 3 is a side elevation view of a motorcycle having the vehicle body cover of the present invention.

Turning now to an embodiment of the present invention, FIG. 3 illustrates a motorcycle having the present vehicle body cover. A double seat 10 includes a front seat 10a and a rear seat 10b. Behind the seat is a trunk 12. Saddle bag containers 14 are provided on either side of the rear seat 10b. Below the front seat 10a are lower center covers 16.

The vehicle body cover 18 includes a front fairing 20 which covers the upper front portion of the motorcycle. Side panels 40 are provided on either side of the motorcycle behind the front fairing 20. A top cover 46 overlies an upper rim 41 of the side panel 40.

Figure 4:
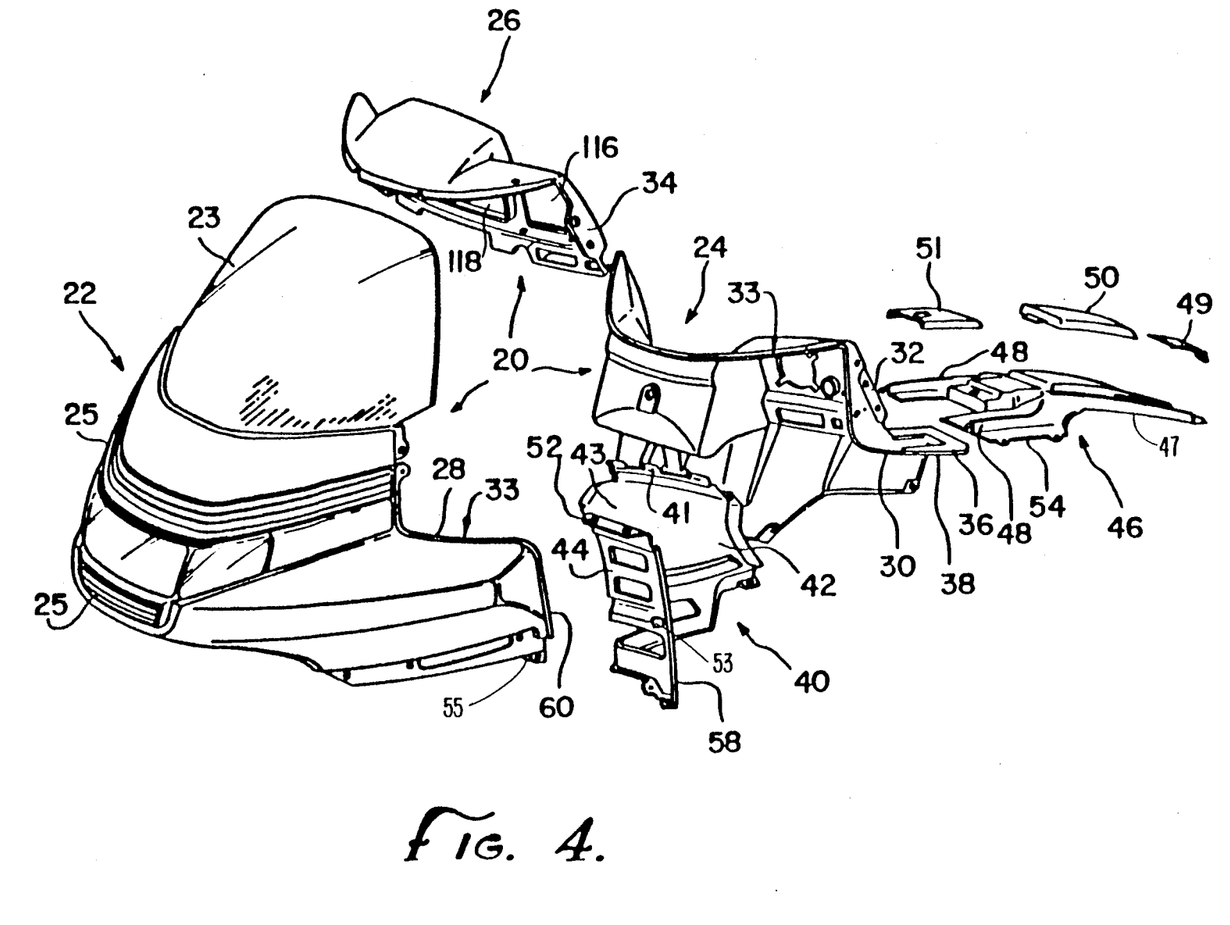
FIG. 4 is an exploded perspective view of the body cover shown in FIG. 3.

FIG. 4 illustrates the individual components of the present vehicle body cover. The front fairing 20 comprises an assemblage of bodies including an outer fairing section 22, an inner fairing section 24, respectively referred to as the "outer fairing" and the "inner fairing" herein, and an instrument panel 26. The outer fairing 22 has a lateral rear edge 28 which engages a lateral forward edge 30 of the inner fairing section 24. The outer fairing section 22 also is provided with louvers 25 and a windscreen 23. In the embodiment shown, the inner fairing 24 comprises an integrally formed structure which includes an upright gusset 32 on the respective oppositely disposed exterior sides thereof each of which mates with an overlying panel 34 on the opposite lateral sides of the instrument panel 26 and facilitates the attachment of the instrument panel 26 to the rear of the inner fairing 24.

Frame-like extension plates 36 having substantially rectangularly disposed peripheral sides of the lower portion of the inner fairing 24 and extend to form a ledge at their rear termini. When the front fairing 20 is assembled, each plate 36 forms a step-like planar section which projects rearwardly from the lower portion of the instrument panel 26 and extends inwardly along the fairing edge 33. An opening 38 is provided in the center of each frame-like extension plate 36 and forms the top opening of a container, as further described hereinafter.

The side panels 40, provided on the left and right sides of the vehicle body, include a side panel inner wall 42 disposed approximately in the same plane as the side 11 of the seat 10a. Integral with the side panel inner wall 42 and extending outwardly generally at right angles therefrom is a flange 44 joined to the inner wall 42 through a smooth radius surface 43. A lateral flange mounting tab 53 on the flange 44 is arranged for detachable connection via a bolt, or the like, to the boss 55 on the outer fairing 22.

A top cover 46 at its rear portion straddles across the upper rim 41 of the side panels 40 disposed on either side of the vehicle. The rear portion of the top cover 46 on opposite sides has an edge or lip 75 that projects downwardly to engage the upper rim 41. Top cover arms 48 extend forwardly from the cover 46. Lids 49, 50 and 51 cover openings in the upper surface of the top cover 46.

Figure 5:
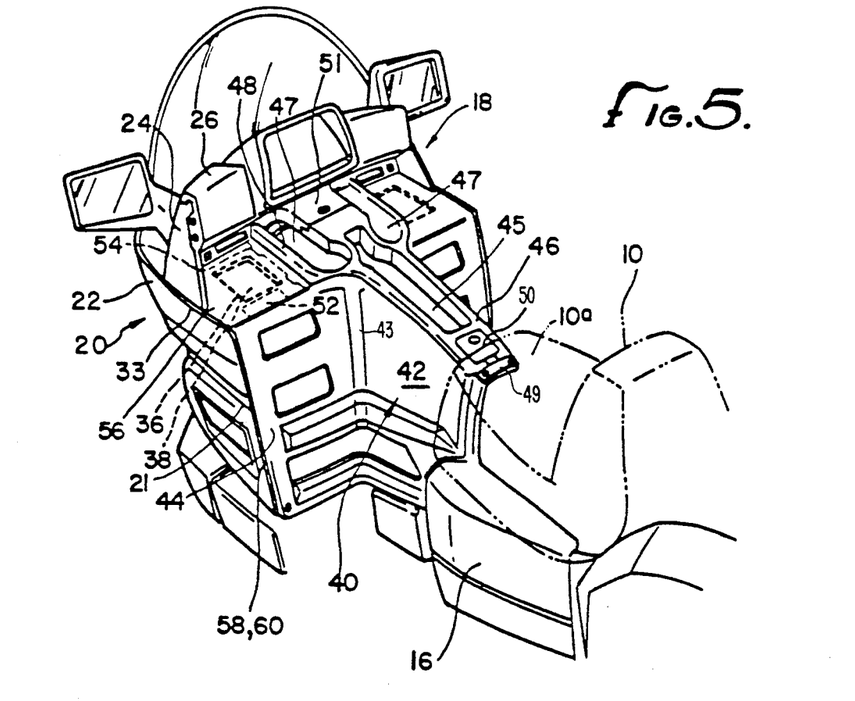
FIG. 5 is a rear perspective view of the present body cover as fully assembled.
Figure 8:
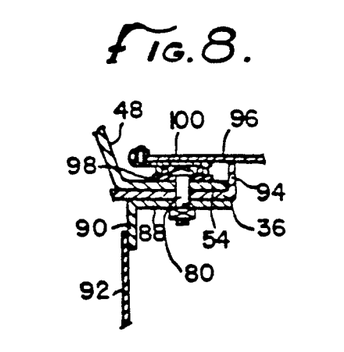
FIG. 8 is a section view taken along line VIII—VIII of FIG. 7.
Figure 9:
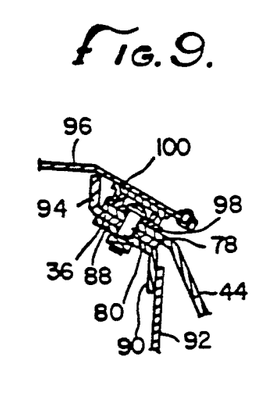
FIG. 9 is a section view taken along line IX—IX of FIG. 7.

Turning now to FIG. 5, the front fairing 20, the side panels 40 and the top cover 46 are connected to each other at the periphery of the extension plates 36 of the front fairing 20. Specifically, the flange 44 of each side panel 40 mates with the extension plate 36 by means of a flange top mounting tab 52 underlying the frame extension plate 36. The top cover 46 connects to the extension plate 36 of inner fairing 24 via the top cover mounting ledges 54 projecting laterally from the top cover arms 48. A pocket bag container 92 (as best seen in FIGS. 8 and 9 which is representative of the present embodiment in this respect) which opens upwardly through the opening 38 is joined to the underside of the plate 36. The corresponding upper surface of the plate 36 includes a removable pocket cover 56 covering the opening 38 and serving to close off the top of the container 96. The connection between the side panels 40 and the top cover 46 is masked by the pocket cover 56. A flange edge 58 coincides with the rear edge 60 of the outer fairing 22, and the flange 44 of the side panel 40 is joined to the outer fairing 22 by the engagement of the flange edge 58 and the outer fairing edge 60.

The body cover 18 is thus formed by assembling the front fairing 20, the side panels 40 and the top cover 46. The forward section of the front seat 10a is sufficiently narrow, as is the lateral dimension across the side panel inner walls 42, such that the rider can straddle the seat with the rider's legs comfortably placed alongside the side panels 40. The flange 44 shields the rider's legs from wind. The narrow side panel inner wall 42 is smoothly transformed into the wide side surface 21 of the outer fairing 22, without a visible seam. In addition, the extension plate 36 may be smoothly blended into the flange 44 of the side panel 40 providing for an attractive body cover outline.

In contrast to the earlier body cover shown on FIG. 1, the present vehicle body cover does not use a separate or intermediate piece 012 to connect the outer fairing side surface 21 to the side panels 40. Rather, a feature of the present invention is that the flange edge 58 of the flange 44 on the side panel 40 is joined directly to the outer fairing rear edge 60. This configuration reduces the number of components required and simplifies the assembly operation of the body cover.

In addition, as the outer fairing 22, the side panels 40, and the top cover 46 are connected to the inner fairing 24, each of these members reinforces the other resulting in a relatively rigid body cover assembly. In particular, the outer fairing 22 is especially well supported and stiffened.

Figure 6:
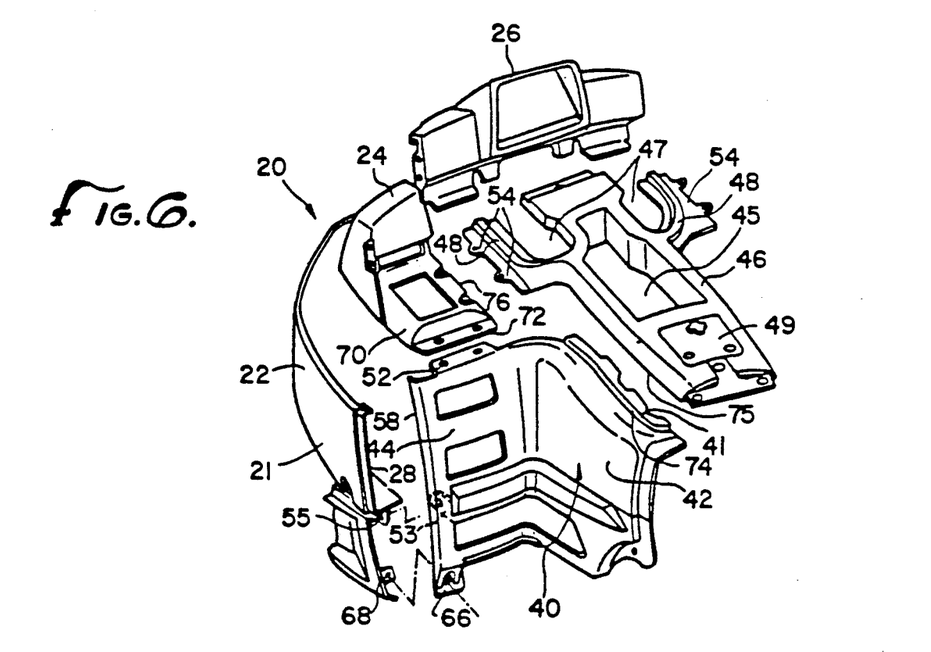
FIG. 6 is an exploded perspective view of a second embodiment of the present body cover.

In a second embodiment of the invention, as illustrated in FIG. 6, the front fairing 20, specifically the outer fairing 22, is a double wall structure connected to the inner fairing 24 and the instrument panel 26. A plate-like frame or extension 70 is provided at both sides of the lower section of the inner fairing 22, with the extensions projecting rearwardly and terminating in a rear ledge or lip 72. A mounting ledge 52 on the flange 44 aligns with the rear ledge 72 for attaching the extension 70 of the inner fairing 24 to the side panel 40. Fasteners are used to secure the mounting ledge 52 to the rear ledge 72. Bosses 55 and 68 on the outer fairing 22 are similarly joined to mounting tabs 53 and 66 on the flange 44.

An upper rim 41 of the side panel 40 is provided with a groove 74 for accommodating the top cover 46. The mounting ledge 54 on each top cover arm 48 is adapted to coincide with the inner edge 76 of the extension plate 70. The top cover 46 has an edge or lip 75 projecting downwardly and engaging into the groove 74 and upper rim 41 of the side panel 40. The top cover 46 is connected to the inner fairing 24 by aligning the mounting ledge 54 of the top cover arm 48 onto the inner edge 76 of the extension plate 70, and by securing it with screws.

In order to allow the handle bar to project upwardly, the top cover 46 includes openings 47 which are spaced apart to align with the protruding handle bar. An opening 45 is provided in the center portion of the top cover 46 to accommodate, for example, a switch board for holding various switches for motorcycle and/or accessory operation.

Due to the interconnection of the components, the front fairing 20, when assembled, is a stiff structure. The stiffness, which may be advantageous in reducing vibration, is further enhanced as the components of the body cover are adapted to reinforce each other. Moreover, as the side panels 40 are directly connected to the outer fairing 22, top cover 46 and inner fairing 24, through bosses and mounting tabs 66 and 68, 55 and 53, and edges 75 and 52, as well as the groove 74 engaging the rear lip 72, no individual separate connecting members are required. Thus the number of parts to the body cover is reduced, and as with the vehicle body cover of FIGS. 3-5, no seam is visible between the cover members.

Figure 7:
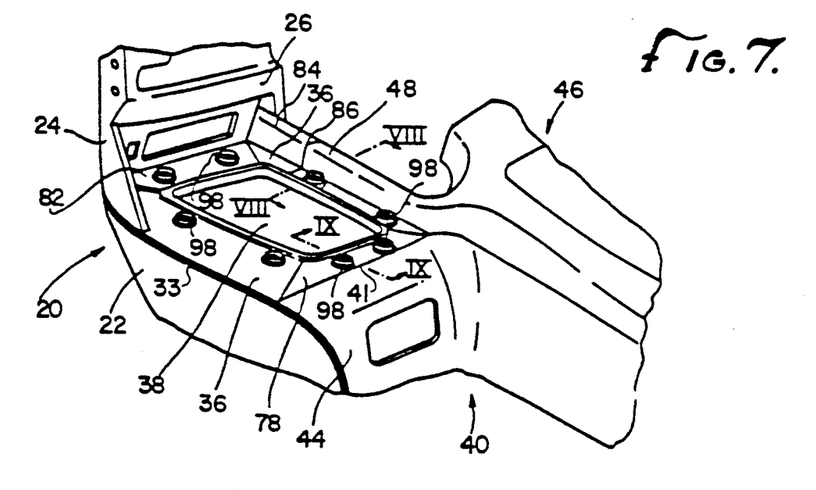
FIG. 7 is a perspective fragment view of a third embodiment.

In a third embodiment of the invention, as shown in FIG. 7, the front fairing 20, the side panels 40 and the top cover 46 are connected to each other at the periphery of the extension plates 36 of the front fairing 20. The side panel 40 has a flange 44 with an upper lip 41 which engages the rear edge of the extension plates 36, such that a mounting ledge 78 on the extension plates 36 mates with the rim 41, and is secured thereto via a fastener 80, as shown in FIG. 9. Similarly, the top cover 46 has the mounting ledge 54 of the top cover arms 48 overlying the extension plates 36 and fixed thereto via screws 80. The instrument panel 26 including a panel mounting ledge 82 adjoined to the front edge section of the extension plates 36 with screws 80.

In front of the extension plates 36 is an integrally formed concave radius 84 which coincides with the arms 48 of the top cover 46. The radius 84 and arm 48 are joined along a junction line 86 on either side of the vehicle.

As shown in FIGS. 8 and 9, on the lower surface of each extension plate 36 is a splice plate 88 clamped against the extension plate 36 with screws 80 along the four peripheral sides of the opening 38. The splice plate 88 is held against the extension plate 36 together with the mounting ledge 78 of the extension plate 36, the mounting ledge 54 of the flange 44 of the side panel 40, and the instrument panel mounting ledge 82. An angle arm 90 is provided around the perimeter of the splice plate 88 and projects downwardly therefrom. A flexible pocket bag container 92 is fixed to and suspended from the angle arm 90. The pocket bag container 92 is used to accommodate articles which may be placed in and removed from the pocket bag via the opening 38. The opening 38 is surrounded by an edge portion 94 which is formed integrally in each extension plate 36 and projects upwardly. The opening 38 is closed by a cover 96 which abuts to an upper surface of the edge portion 94.

In order to releasably engage the cover 96 to the extension plate 36, a snap grommet or section 98 is arranged at the periphery of the opening 38, and held in place therein by a screw 80. Around the perimeter of the lower or back surface of the cover 96, and at each position thereon corresponding to a location of the snap section 98, a snap cover 100 is provided which resiliently engages the snap section 98. The cover 96 may be held open for access to the pocket bag container 92 and secured in a closed position by the engagement of the snap section 98 and snap cover 100.

In contrast to the vehicle cover of FIG. 2, in the invention of FIG. 7, the cover components are formed integrally with each other and are mounted to cover the motorcycle surfaces facing the rider. The integral cover panel is combined with the inner fairing 24 such that the inner fairing is reinforced. This makes it possible to lighten the inner fairing itself while simultaneously increasing its stiffness. Furthermore, the cover surfaces are integral and continuous such that the contours and outline of the motorcycle are smooth-looking, streamlined, and attractive.

Figure 10:
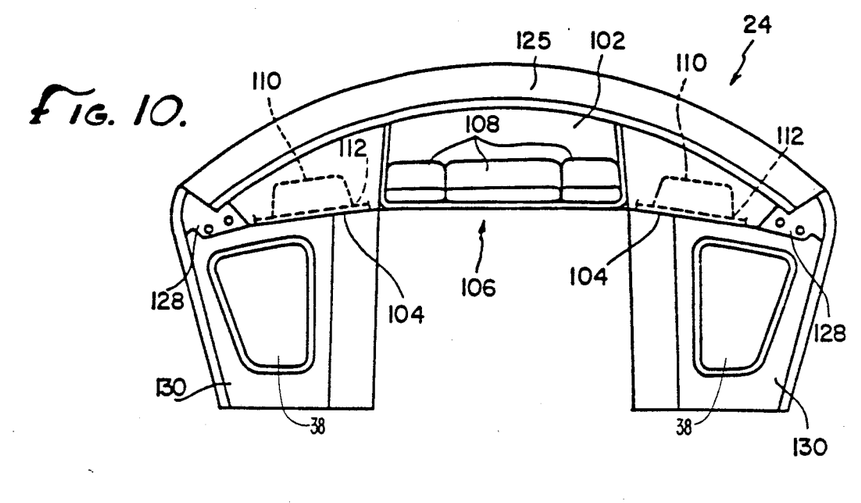
FIG. 10 is a plan view of the inner fairing of the vehicle body cover of the present invention.

As shown in FIG. 10, a box-shaped instrument opening 102 is centrally formed integrally and symmetrically within the inner fairing 24. A flat speaker mounting plate 104 is provided on both sides of the instrument opening 102. Within the instrument opening 102, there is a rear facing panel 106 supporting various instruments 108. A speaker 110 is mounted on the rear surface of each speaker mounting plate 104. A speaker opening 112 is provided in each speaker mounting plate 104, around the speaker 110, so that the sounds generated by the speaker 110 can radiate rearwardly towards the rider. The dash panel 106, and the speakers 110 are mounted on the inner fairing 24 facing rearwardly and are covered by a forward cover 114.

Figure 11:
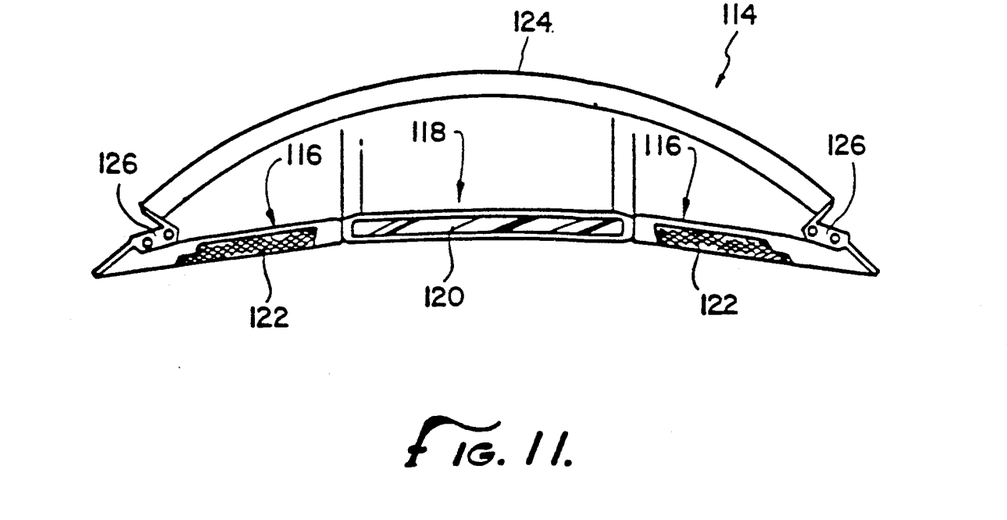
FIG. 11 is a plan view of a cover panel for the inner fairing of FIG. 10.

As best shown in FIG. 11, side openings 116 and a center opening 118 are provided in the instrument panel 106 at positions respectively corresponding to the speakers 110 and the dash panel 106. A transparent plate 120 is fitted onto the opening 118 while the side opening 116 is covered by a speaker grill 122. The forward cover 114 is adapted to integrally support the components respectively provided on the dash panel 106, as well as the speakers. An upper edge 124 of the forward cover 114 has a shape corresponding to the inner fairing edge.

Side surfaces 126 are provided at both sides of the forward cover 114. As shown on FIG. 12, the forward cover 114 is assembled onto the inner fairing 24 by inserting the side surfaces 126 into the inside of side slots 128 on the inner fairing and by aligning the upper edge 124 of the forward cover 114 with the rear edge 125 of the inner fairing 24 with screws. The transparent plate 120 and the speaker grill 122 then approximately locate over the dash panel 106 and the speakers 110. A frame 130 extends at both sides of the inner fairing 24 rearwardly through a louver portion of the forward cover 114. The frames 130 are fixed to the side panels and top cover, as previously described. A frame opening 38 is provided within the frame 130 for a container pocket.

Figure 12:
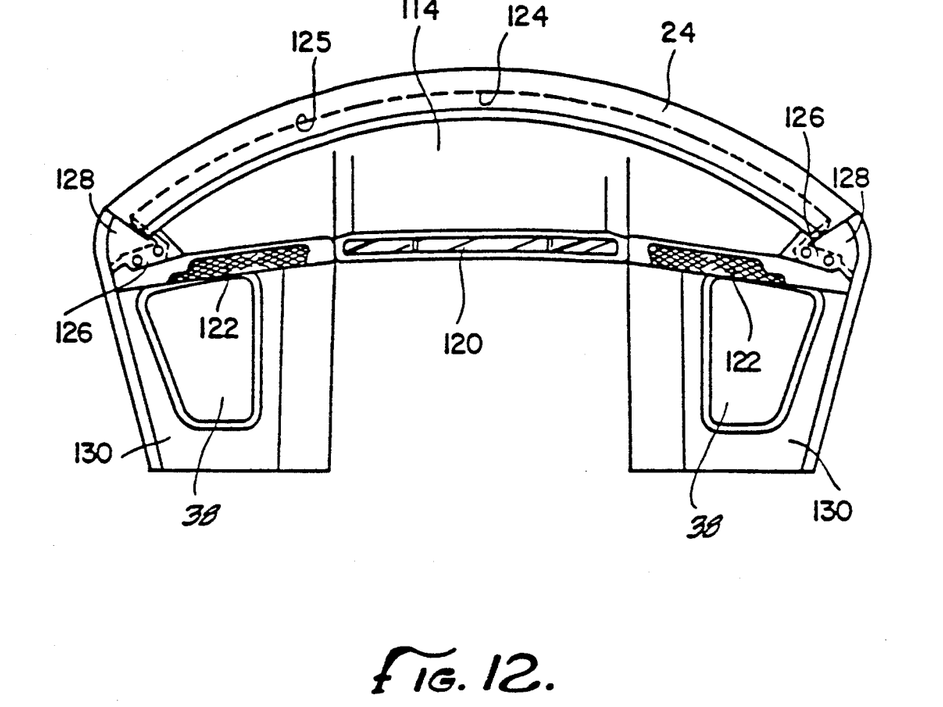
FIG. 12 is a plan view illustrating the assembly of the inner fairing of FIG. 10 and the cover panel of FIG. 11.

The forward cover 114 being assembled to the inner fairing 24 increases the inner fairing stiffness by providing a reinforcing effect. The forward cover 114 also acts substantially as an integral reinforcing member connecting both sides of the inner fairing 24. Accordingly, even if the inner fairing 24 is relatively thin, it can still have sufficient structural rigidity and can, therefore, be made lighter.

Thus, a vehicle cover is disclosed which provides improved stiffness and appearance, is lightweight, and involves relatively few parts. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A body cover for a motorcycle, comprising:
   an outer fairing having a rear edge and upright lateral edges including mounting bosses;
   an inner fairing having a forward fairing edge and a pair of spaced apart extension plates each terminating in a planar rear ledge, said forward fairing edge being engaged to said rear edge of said outer fairing;
   an instrument panel mounted on said inner fairing intermediate said extension plates;
   first and second side panels oppositely disposed on the left and right sides of the motorcycle, each side panel having an inner wall positionable alongside the motorcycle, and a flange extending substantially perpendicularly outwardly from said inner wall, said inner wall of each said side panel having an upper rim, each said flange having a lateral flange mounting tab and a top flange mounting tab, said first and second side panels being attached to said outer fairing by said mounting bosses on said upright lateral edges of said outer fairing engaging said lateral flange mounting tab on each flange of each said side panel, with said top flange mounting tab of each flange engaged to said planar rear ledge of each said extension plate of said inner fairing; and
   a top cover having two spaced apart arms and a top cover lip, each of said arms having a mounting ledge engaged to an inner edge of each extension plate of said inner fairing, and said top cover lip engaging said upper rim of said side panel inner walls.

2. A body cover for a motorcycle, comprising:
   a double-wall outer fairing having a generally horizontal rear edge and left and right spaced-apart upright lateral edges extending generally vertically, said left and right upright edges having at least two bosses with openings for accepting a fastener;
   an inner fairing having a forward fairing edge and spaced-apart left and right extension plates, said extension plates having a planar rear lip at the end thereof opposite to said forward fairing edge, each extension plate also including an inner edge, and a center opening accommodating a pocket bag container, said forward fairing edge engaged to said rear edge of said outer fairing;
   an instrument panel disposed on said inner fairing intermediate said left and right extension plates;
   a left side panel and a right side panel each having a planar inner wall positioned alongside the motorcycle, and a flange extending generally perpendicularly outwardly therefrom, each inner wall having an upper rim, with each flange having at least one lateral mounting tab and a top flange mounting tab, said left and right side panels attached to said outer fairing by joining said bosses on said left and right upright edges to said lateral mounting tabs on said left and right side panels, respectively, with fasteners, said top flange mounting tab on said left and right side panels being attached to said rear ledge of said left and right extension plates, respectively; and
   a top cover including a left arm spaced apart from a right arm, and a top cover lip, said left and right arms each having a mounting ledge extending outwardly therefrom and engaging said inner edge of said left and right extension plates, and joined thereto with fasteners, said top cover lip overlying and engaging said upper rim of said side panel inner wall of said left and right side panels.

3. A body cover for a motorcycle, comprising:
   an outer fairing having a rear edge;
   an inner fairing having a forward edge engagable with said outer fairing along said rear edge;
   an instrument panel unit attached to said inner fairing;
   left and right side panels each including an inner wall having an upper rim and an integral flange extending outwardly therefrom, said flange being attached to said rear edge of said outer fairing; and
   a top cover extending between and interconnecting said upper rim of said side panels and said inner fairing.

4. The motorcyle body cover of claim 3 particularly adapted for a motorcycle having a seat disposed substantially on the longitudinal axis thereof; wherein said seat has sides, and wherein said inner walls of said side panels are substantially co-planar with said seat sides.

5. The body cover of claim 3 wherein said outer fairing has a side surface including an horizontal fairing edge joined to a frame on each inner fairing, and a generally vertical fairing edge joined to said flange of each side panel.

6. A body cover for a motorcycle formed of an assemblage of separate detachably connected parts, comprising:
   a forwardly facing outer fairing extending transversely of the longitudinal axis of said motorcycle and having a rear edge;
   means forming a rearwardly facing inner fairing engaging said outer fairing on opposite sides of said longitudinal axis; said inner fairing means comprising an integrally formed structure section extending transversely of said longitudinal axis;
   side panels positioned on opposite sides of said longitudinal axis each said side panel including an inner wall extending generally parallel to said axis and an integrally formed flange extending laterally outwardly therefrom and engaging said outer fairing rear edge;
   an instrument panel extending transversely of said longitudinal axis;
   means for securing said instrument panel at opposite sides thereof to said inner fairing means; said securing means including an upright gusset disposed along the exterior sides of said inner fairing means for detachably securing said instrument panel on opposite lateral sides thereof;
   a top cover traversing said longitudinal axis between said connecting said side panels; and
   means for detachably interconnecting said parts outer fairing, said inner fairing means, said side panels, said instrument panel and said top cover.

7. A motorcycle body cover formed of an assemblage of separate, detachably connected parts, comprising:
   an outer fairing having a generally horizontal rear edge and left and right spaced-apart upright lateral edges extending generally vertically, said left and right upright edges having at least two bosses with openings for accepting a fastener;
   an inner fairing having a forward fairing edge and spaced-apart left and right extension plates, said extension plates having a planar rear lip at the end thereof opposite to said forward fairing edge, each extension plate also including an inner edge, and a center opening accommodating a pocket bag container, said forward fairing edge engaged to said rear edge of said outer fairing;

an instrument panel disposed on said inner fairing intermediate said left and right extension plates;

a left side panel and a right side panel each having a planar inner wall positioned alongside the vehicle, and a flange extending generally perpendicularly outwardly therefrom, each inner wall having an upper rim, with each flange having at least one lateral mounting tab and a top flange mounting tab, said left and right side panels attached to said outer fairing by joining said bosses on said left and right upright edges to said lateral mounting tabs on said left and right side panels, respectively, with fasteners, said top flange mounting tab on said left and right side panels attached to said rear ledge of said left and right extension plates, respectively; and a top cover including mutually spaced apart left arm and right arm, and a top cover lip, said left and right arms each having a mounting ledge extending outwardly therefrom and engaging said inner edge of said left and right extension plates, and joined thereto said fasteners, said top cover lip overlying and engaging said upper rim of said side panel inner wall of said left and right side panels.

8. A body cover for a motorcycle comprising:

a forwardly facing outer fairing extending transversely of the longitudinal axis of said motorcycle and having a rear edge;

means forming a rearwardly facing inner fairing engaging said outer fairing on opposite sides of said longitudinal axis;

side panels positioned on opposite sides of said longitudinal axis each including an inner wall extending generally parallel to said axis and an integrally formed flange extending laterally outwardly from the forward portion of said side panels and engaging said outer fairing rear edge;

a top cover transversing said longtidudinal axis between and connecting said side panels; and means for detachably interconnecting said outer fairing, said inner fairing means, said side panels and said top cover.

9. The motorcycle body cover of claim 8 in which said inner fairing means includes first and second framelike extension plates disposed on opposite sides of said longitudinal axis and protruding in a generally planar rearward direction; said plates including means for attaching said side panels and said top cover thereto.

10. The motorcycle body cover of claim 9 including mounting tabs means disposed on said side panels and said top cover for detachably engaging said extension plates; and wherein said extension plates comprise substantially rectangularly disposed sides including means disposed on the periphery thereof for cooperating with said mounting tab means on said side panels and said top cover.

11. The motorcycle body cover of claim 10 in which said top cover includes a forward portion having oppositely disposed arms for attachment to said extension plates and a rearward portion containing oppositely, disposed means for attachment to the respective side panel inner walls.

12. The motorcycle body cover of claim 8 including an upper rim along the inner wall of said each side panel for engaging a facing edge of said top cover.

13. The motorcycle body cover of claim 12 wherein said top cover has oppositely spaced lips; and including means disposed on said inner wall upper rim for engaging said lips on said top cover.

14. The motorcycle body cover of claim 9 including a pocket bag container secured to and disposed generally beneath one or both of said first and second framelike extension plates and means for accessing said pocket bag containers through said extension plates.

15. The motorcycle body cover of claim 14 including a closure cover overlying each said extension plate center opening; and means for detachably securing each said closure cover to said extension plate.

16. The motorcycle body cover of claim 14 including means for securing said pocket bag to said extension plate comprising a splice plate secured to said extension plate about the opening therein; an angluraly offset angle arm on said splice plate; and means for securing said pocket bag to said angle arm.

17. The motorcycle body cover of claim 8 including an instrument panel extending transversely of said longitudinal axis; and means for securing said instrument panel at opposite sides thereof to said inner fairing means.

18. The motorcycle body cover of claim 17 in which said inner fairing means comprise an integrally formed structure extending transversely of said longitudinal axis; and said securing means includes an upright gusset disposed along the exterior sides of said integrally formed structure for detachably securing said instrument panel on opposite lateral sides thereof.

19. The motorcycle body cover of claim 17 wherein said inner fairing means comprises a plurality of components whereupon said extension plates are mounted so as to be on opposite sides of said longitudinal axis; and wherein said instrument panel extends between and secures said components.

20. The motorcycle body cover of claim 17 wherein said inner fairing means includes speaker mounting plates disposed on opposite sides of said longitudinal axis, each said mounting plate having a speaker detachably engaged therewith; and wherein said instrument panel includes a forward cover having speaker grills disposed on opposite sides thereof so as to proximally align with and cover said speakers.

21. The motorcycle body cover of claim 20 wherein said inner fairing means includes means for securing one or more instruments intermediate said speaker mounting plates; and said instrument panel includes a transparent panel cooperatively engaging an opening therein so as to proximally align with and cover said one or more instruments.

22. The motorcycle body cover of claim 8 in which said side panel flanges substantially perpendicularly to said inner walls thereof and are integrally joined thereto by a smooth radius surface.

23. The motorcycle body cover of claim 8 wherein said outer fairing comprises a double-walled structure.

* * * * *

UNITED STATES PATENT AND TRADEMARK OFFICE
CERTIFICATE OF CORRECTION

PATENT NO. : 5,109,942
DATED : May 5, 1992
INVENTOR(S) : Akimori et al.

It is certified that error appears in the above-identified patent and that said Letters Patent is hereby corrected as shown below:

In claim 6 (col. 8, l. 52) delete "said" and insert therefor -- and --.

In claim 11 (col. 9, l. 64) delete ",".

In claim 12 (col. 10, l. 4) delete "said each" and insert therefor -- each said --.

In claim 18 (col. 10, l. 31), delete "comprise" and insert therefor -- comprises --.

In claim 22 (col. 10, l. 59), after "flanges" insert -- extend --.

Signed and Sealed this

Twenty-first Day of June, 1994

Attest:

*Attesting Officer*

BRUCE LEHMAN
*Commissioner of Patents and Trademarks*